(12) United States Patent
Zhao et al.

(10) Patent No.: US 10,042,132 B2
(45) Date of Patent: Aug. 7, 2018

(54) OPTICAL MODULE

(71) Applicants: Hisense Broadband MultiMedia Technologies Co., Ltd, Shandong (CN); HISENSE USA CORP., Suwanee, GA (US); Hisense International Co., Ltd., Shandong (CN)

(72) Inventors: Wei Zhao, Shandong (CN); Xuxia Liu, Shandong (CN); Lin Yu, Shandong (CN)

(73) Assignees: HISENSE BROADBAND MULTIMEDIA TECHNOLOGIES CO., LTD, Shandong (CN); HISENSE USA CORP., Suwanee, GA (US); HISENSE INTERNATIONAL CO., LTD., Shandong (CN)

( * ) Notice: Subject to any disclaimer, the term of this patent is extended or adjusted under 35 U.S.C. 154(b) by 0 days.

(21) Appl. No.: 15/229,749

(22) Filed: Aug. 5, 2016

(65) Prior Publication Data
US 2017/0160498 A1    Jun. 8, 2017

(30) Foreign Application Priority Data

Dec. 7, 2015    (CN) .......................... 2015 1 0896953

(51) Int. Cl.
*G02B 6/42*    (2006.01)
(52) U.S. Cl.
CPC .......... *G02B 6/4277* (2013.01); *G02B 6/428* (2013.01); *G02B 6/4214* (2013.01); *G02B 6/4292* (2013.01)

(58) Field of Classification Search
CPC ..... G02B 6/4292; G02B 6/428; G02B 6/4277
See application file for complete search history.

(56) References Cited

U.S. PATENT DOCUMENTS

| 7,182,612 B1* | 2/2007 | Immethun | H01R 13/65802 |
| | | | 439/108 |
| 8,550,727 B2* | 10/2013 | Meadowcroft | G02B 6/4277 |
| | | | 385/136 |
| 2004/0203289 A1* | 10/2004 | Ice | H05K 9/0058 |
| | | | 439/607.2 |

(Continued)

FOREIGN PATENT DOCUMENTS

| CN | 1781046 A | 5/2006 |
| CN | 101406111 A | 4/2009 |

(Continued)

OTHER PUBLICATIONS

Office Action Chinese Patent Application No. 2015108969515 dated Sep. 13, 2016 w/English language translation.

*Primary Examiner* — Ryan Lepisto
*Assistant Examiner* — Erin Chiem
(74) *Attorney, Agent, or Firm* — McDermott Will & Emery LLP

(57) ABSTRACT

Some embodiments of the present disclosure disclose an optical module. The optical module comprises a housing; a circuit board is provided inside the housing, and a connecting finger pluggable in an optical module cage is provided on the circuit board. At least one reflector, which is located between the connecting finger and an optical port of the optical module and can reflect electromagnetic waves radiated onto a surface of the reflector, is provided between the circuit board and the housing.

19 Claims, 2 Drawing Sheets

(56) References Cited

U.S. PATENT DOCUMENTS

2012/0148201 A1    6/2012  Kondou et al.
2014/0299752 A1*  10/2014  Huang ............... G02B 19/0028
                                                      250/227.11

FOREIGN PATENT DOCUMENTS

| CN | 205157853 U | | 4/2016 |
|----|----|----|----|
| JP | 2012-42719 A | | 3/2012 |
| JP | 2013029639 A | * | 2/2013 |
| WO | 2004088381 A1 | | 10/2004 |
| WO | 2007109773 A2 | | 9/2007 |

* cited by examiner

OPTICAL MODULE

CROSS-REFERENCE TO RELATED APPLICATIONS

The present application claims priority of Chinese Patent Application No. 201510896953.5, submitted to Chinese Patent Office on Dec. 7, 2015 and titled "OPTICAL MODULE", the disclosure of which is incorporated herein by reference in its entirety.

FIELD

The present disclosure relates to the technical field of optical fiber communication, and in particular to an optical module.

BACKGROUND

In optical fiber communication technologies, optical signals, as carriers for information, perform high-speed, long-time and reliable information transmission. The function of optical modules is photovoltaic conversion. That is, a sending terminal converts an electric signal to an optical signal; and after transferring the optical signal by an optical fiber, a receiving terminal converts the optical signal to the electric signal again.

SUMMARY

Some embodiments of the present disclosure provide an optical module, including a housing; a circuit board is provided inside the housing; a connecting finger pluggable in an optical module cage is provided on the circuit board; a reflector, which is located between the connecting finger and an optical port of the optical module and can reflect electromagnetic waves radiated onto a surface of the reflector, is provided between the circuit board and the housing.

BRIEF DESCRIPTION OF THE DRAWINGS

In order to describe technical solutions in some embodiments of the present disclosure more clearly, the accompanying drawings to be used in the description of some embodiments will be introduced briefly below. Obviously, the accompanying drawings in the description below are merely some embodiments of the present disclosure. For a person of ordinary skill in the art, other accompanying drawings can be obtained according to these accompanying drawings without paying any creative effort.

DETAILED DESCRIPTION

The accompanying drawings in some embodiments of the present disclosure are incorporated to describe the technical solutions in some embodiments of the present disclosure below. Obviously, the embodiments described are merely some but not all embodiments of the present disclosure. On the basis of the embodiments of the present disclosure, all other embodiments obtained by a person of ordinary skill in the art without paying any creative effort shall fall into the protection scope of the present disclosure.

In the description of the present disclosure, it should be noted that, the orientation or location relation indicated by terms such as "center", "up", "below", "front", "back", "left", "right", "vertical", "horizontal", "top", "bottom", "internal", "external" and the like is an orientation or location relation based on what is shown in the accompanying drawings, and is merely used for conveniently describing the present disclosure and simplifying the description, instead of indicating or implying that the involved devices or elements must have a specific orientation, and must be constructed and operated in a specific orientation. Therefore, these terms shall not be regarded as limitations to the present disclosure.

In the description of the present disclosure, unless otherwise specified, "a plurality of" means two or more.

One of some optical modules includes a housing and a circuit board provided inside the housing, and a connecting finger is provided on the circuit board. When the optical module is inserted into an optical module cage for operation, a large quantity of electromagnetic waves will be generated inside the optical module cage and also at the connecting finger of the circuit board. These electromagnetic waves will pass through the optical module and leak from an optical port thereof, or leak from an opening of the optical module cage, causing interference to other surrounding electronic devices.

Figure 1:
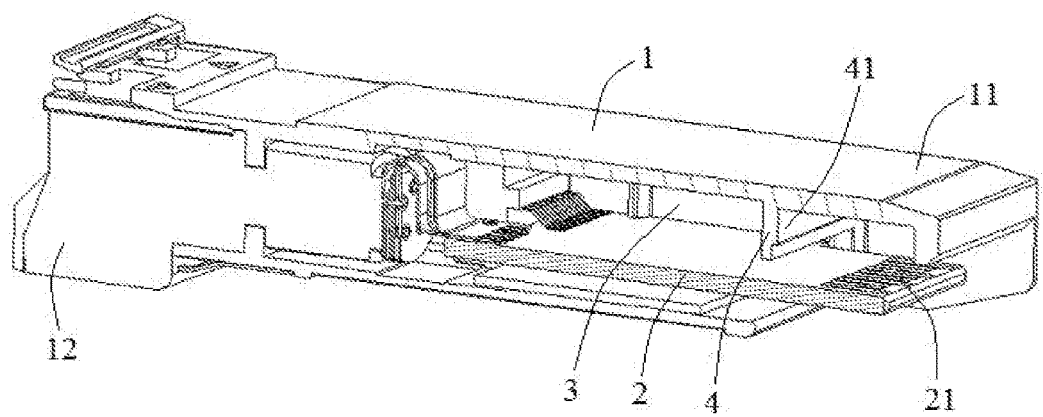
FIG. 1 is a schematic view when a reflecting surface of a reflector is perpendicular to a plane of a circuit board in an optical module according to some embodiments of the present disclosure.
Figure 2:
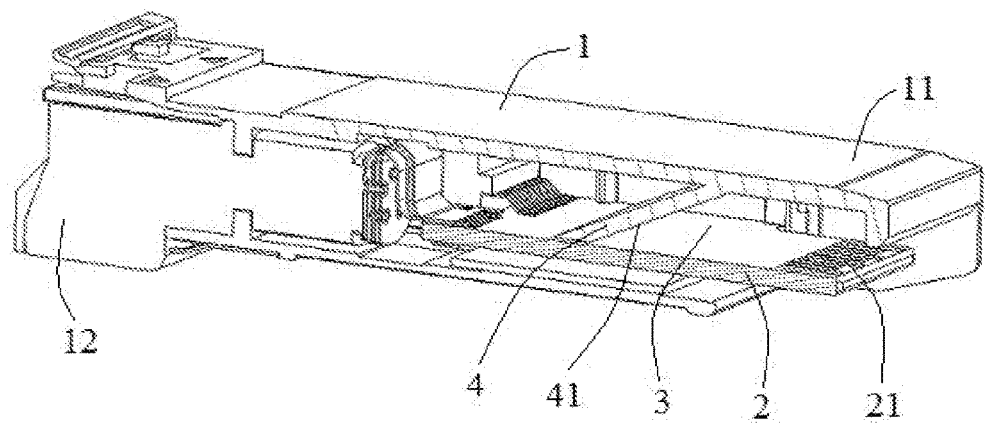
FIG. 2 is a schematic view when an included angle between the reflecting surface of the reflector and the plane of the circuit board is between 15° to 30° in an optical module according to some embodiments of the present disclosure.
Figure 3:
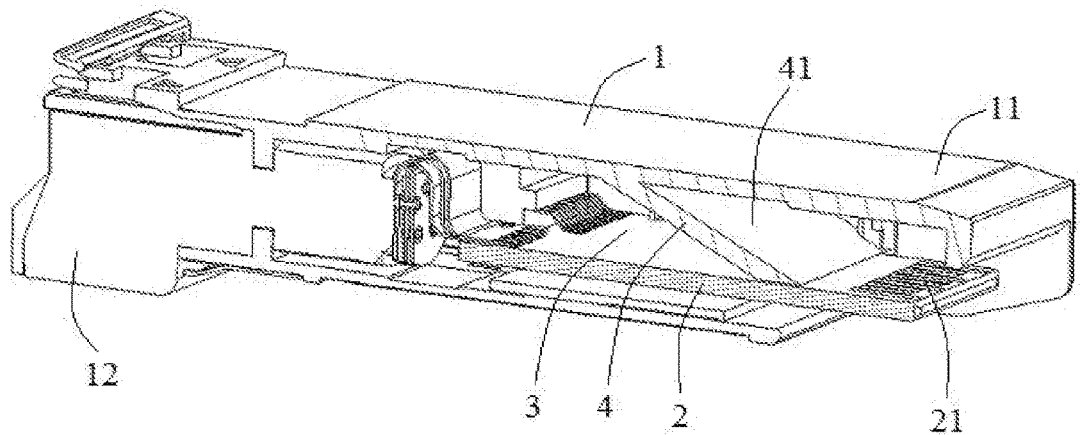
FIG. 3 is a schematic view when an included angle between the reflecting surface of the reflector and the plane of the circuit board is between 150° to 165° in an optical module according to some embodiments of the present disclosure.

FIGS. 1 to 3 show some embodiments of the optical module of the present disclosure. The optical module in the embodiments includes a housing 1; a circuit board 2 is provided inside the housing 1, and a connecting finger 21 pluggable in an optical module cage (not shown) is provided on the circuit board 2; and at least one reflector 4, which is located between the connecting finger 21 and an optical port 12 of the optical module and can reflect electromagnetic waves radiated onto a surface of the reflector, is provided between the circuit board 2 and the housing 1.

Figure 5:
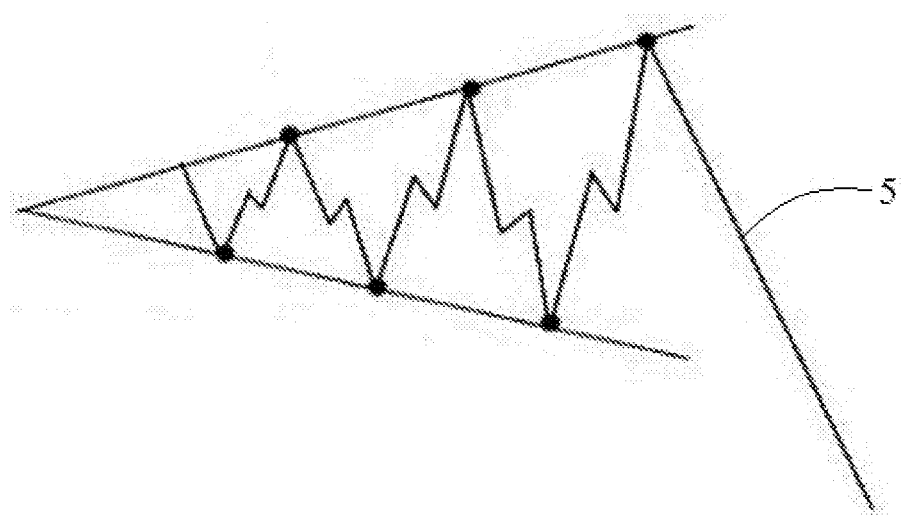
FIG. 5 is a schematic view when electromagnetic waves are reflected for multiple times in some embodiments of the present disclosure.

With regard to the optical module provided in the embodiments of the present disclosure, since a reflector 4 is provided between the housing 1 and the circuit board 2 and the reflector 4 is located between the connecting finger 21 and the optical port 12 of the optical module, when the optical module is inserted into the optical module cage for operation, the electromagnetic waves generated inside the optical module cage and at the connecting finger 21 of the circuit board 2 are radiated onto the reflector 4. Here, the reflector 4 can reflect the electromagnetic waves 5 so that the electromagnetic waves 5 can be reflected between the reflector 4 and the housing 1 or between the reflector 4 and the circuit board 2 for multiple times. In each reflection, part of energy of the electromagnetic waves 5 is absorbed, and consequently, the electromagnetic waves 5 may be attenuated. In this way, radiation of the electromagnetic waves may be reduced, and interference to other surrounding electronic devices may be avoided. FIG. 5 is a schematic view of reflecting electromagnetic waves 5 between two objects for multiple times. The two objects here can be the reflector 4 and the housing 1, and can also be the reflector 4 and the circuit board 2.

It should be noted that the circuit board 2 is located at an electric port 11 of the optical module, and the reflector 4 is arranged in gaps 3 between the housing 1 and the circuit board 2. When there are gaps 3 on two sides of the circuit board 2, reflectors 4 are arranged inside the gaps 3 on the two sides, respectively, in order to attenuate the electromagnetic waves. Thus, interference from the electromagnetic waves to other surrounding electronic devices may be avoided.

In order to attenuate the electromagnetic waves, the reflectors 4 in the embodiments are arranged in coordination with the gaps 3, in order to block the gaps 3. In this way, the electromagnetic waves generated inside the optical module cage and at the connecting finger 21 of the circuit board 2 will be radiated more onto the surface of the reflector 4, and reflected between the reflector 4 and the housing 1 or between the reflector 4 and the circuit board 2 for multiple times. In this way, the electromagnetic waves may be attenuated.

With reference to FIG. 2, since a plurality of components (not shown) are provided on the circuit board 2, when the optical module is inserted into the optical module cage for operation, the electromagnetic wave generated inside the optical module cage will enter into the optical module. As a result, the normal operation of the components might be influenced. In order to avoid this problem, with reference to FIGS. 1 to 3, in some embodiments of the present disclosure, the reflector 4 is arranged between one of the plurality of components having a smallest distance from the connecting finger 21 and the connecting finger 21. Therefore, when the electromagnetic waves generated inside the optical module cage are radiated onto the reflector 4, the electromagnetic waves can be reflected by the reflector 4, so that the electromagnetic waves may be prevented from entering into the optical module. In this way, influence on the normal operation of the components may be avoided.

The reflecting surface 41 of the reflector 4 can be a plane, and can also be a curved surface.

In some embodiments of the present disclosure, with reference to FIG. 1, the reflecting surface 41 of the reflector 4 is a plane; the reflecting surface 41 of the reflector 4 is perpendicular to a plane of the circuit board 2; and when the electromagnetic waves are radiated onto the reflecting surface 41 perpendicular to the plane of the circuit board 2, the electromagnetic waves can be reflected.

In some embodiments of the present disclosure, with reference to FIG. 2, the reflecting surface 41 of the reflector 4 is a plane; an angle between the reflecting surface 41 of the reflector 4 and the plane of the circuit board 2 is between 15° and 30°. Here, the electromagnetic waves radiated onto the reflecting surface 41 can be reflected between the reflector 4 and the circuit board 2 for multiple times so as to attenuate the electromagnetic waves. In such a case, the smaller the angle between the reflecting surface 41 and the plane of the circuit board 2 is, the more times the electromagnetic waves are reflected between the reflector 4 and the circuit board 2. In this way, the electromagnetic waves may be better attenuated. However, if the angle is too small, the length of the reflecting surface 41 will be increased, and further, the space occupied by the reflector 4 will be increased. For this reason, in some embodiments, the angle between the reflecting surface 41 of the reflector 4 and the plane of the circuit board 2 in these embodiments is between 15° and 30°. Such an angle may not only better attenuate the electromagnetic waves, but also reduce the space occupied by the reflector 4.

In some embodiments of the present disclosure, with reference to FIG. 3, the reflecting surface 41 of the reflector 4 is a plane; an angle between the reflecting surface 41 of the reflector 4 and a plane of the circuit board 2 is between 150° and 165°. Here, the electromagnetic waves radiated onto the reflecting surface 41 can be reflected between the reflector 4 and the housing 1 for many times so as to attenuate the electromagnetic waves. In such a case, the bigger the angle between the reflecting surface 41 and the plane of the circuit board 2 is, the smaller the angle between the reflecting surface 41 and the housing 1 is, and the more times the electromagnetic waves are reflected between the reflector 4 and the housing 1. In this way, the electromagnetic waves may be better attenuated. However, if the angle between the reflecting surface 41 and the plane of the circuit board 2 is too big, the length of the reflecting surface 41 will be increased, and further, the space occupied by the reflector 4 will be increased. For this reason, the angle between the reflecting surface 41 of the reflector 4 and the plane of the circuit board 2 in these embodiments is between 150° and 165°. Such an angle may not only better attenuate the electromagnetic waves, but also reduce the space occupied by the reflector 4.

Figure 4:
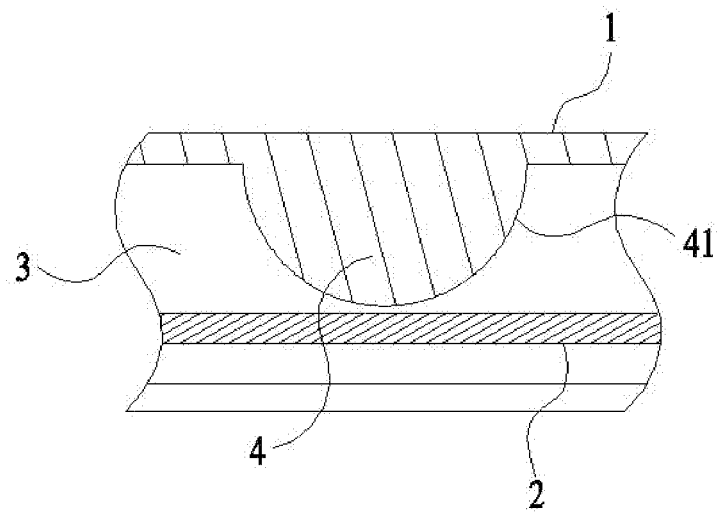
FIG. 4 is a schematic view when the reflecting surface of the reflector is a curved surface in an optical module according to some embodiments of the present disclosure.

In some embodiments of the present disclosure, with reference to FIG. 4, the reflecting surface 41 of the reflector 4 is a curved surface, including a convex surface and a concave surface. The reflecting surface 41 of the reflector 4 in some embodiments is a convex surface. Here, the angle between the convex surface and the circuit board 2 is smaller than that between the concave surface and the circuit board 2. The times the electromagnetic waves are reflected between the reflecting surface 41 and the circuit board 2 may be increased so as to better attenuate the electromagnetic waves.

It should be noted that the reflector 4 and the housing 1 can be integrated, and can also be split; and when the reflector 4 and the housing 1 are split, the reflector 4 can be fixed on the housing 1.

The reflector 4 is made of metal which can absorb part of electromagnetic waves radiated onto the reflector and reflect the other so as to attenuate the electromagnetic waves. For example, the reflector 4 can be made of zinc alloy consistent with that of the housing 1.

Wave-absorbing material is attached onto a surface of the reflector 4 and/or an internal surface of the housing 1. The wave-absorbing material can absorb energy of electromagnetic waves radiated onto the surface of it so as to attenuate the electromagnetic waves. It should be noted that the wave-absorbing material can be attached onto only the reflecting surface 41, or can be attached onto only the internal surface of the housing 1 forming a wedge with the reflecting surface 41, or can be attached onto both the reflecting surface 41 and the internal surface of the housing 1. The wave-absorbing material here can be ferrite wave-absorbing material or polyurethane wave-absorbing material.

The reflector 4 can be a curved reflecting plate, and can also be a flat reflecting plate. With references to FIGS. 1 to 3, the reflector 4 is a flat reflecting plate, one end of which is fixed on the housing 1, and the other end of which is insulated with the circuit board 2. In this way, a short circuit in the circuit board 2 may be avoided, and influence on the normal operation of the circuit board 2 may be avoided. In order to reach an insulating effect as mentioned above, insulating material can be provided between the flat reflecting plate and the circuit board 2, or the flat reflecting plate is separated from the circuit board 2.

The foregoing descriptions are merely some embodiments of the present disclosure. However, the protection scope of the present disclosure is not limited thereto. Any changes or replacements made by those skilled in the art within the technical scope disclosed by the present disclosure should fall into the protection scope of the present disclosure. Therefore, the protection scope of the present disclosure shall be subject to the protection scope of the claims.

What is claimed is:

1. An optical module, comprising:
   a housing;
   a circuit board provided inside the housing;
   a connecting finger pluggable in the optical module cage provided on the circuit board; and
   at least one reflector provided on an inner surface of the housing opposite to the circuit board and extending towards the circuit board,
   wherein the at least one reflector is located between the connecting finger and an optical port of the optical module,
   each of the at least one reflector has a reflecting surface facing the connecting finger, and
   the reflecting surface reflects electromagnetic waves radiated onto the reflecting surface;
   the at least one reflector comprises two reflectors;
   there are respective gaps between any of two sides of the circuit board and the housing; and the two reflectors are provided inside the gaps on the two sides, respectively.

2. The optical module according to claim 1, wherein the two reflectors are arranged in coordination with the gaps on the two sides, in order to block the gaps on the two sides.

3. The optical module according to claim 1, wherein a plurality of components are provided on the circuit board; and the at least one reflector is arranged between one of the plurality of components having a smallest distance from the connecting finger and the connecting finger.

4. The optical module according to claim 1, wherein a reflecting surface of each of the at least one reflector is a plane, and the reflecting surface is perpendicular to a plane of the circuit board.

5. The optical module according to claim 1, wherein a reflecting surface of each of the at least one reflector is a plane, and an angle between the reflecting surface and a plane of the circuit board is between 15° and 30°.

6. The optical module according to claim 1, wherein a reflecting surface of each of the at least one reflector is a plane, and an angle between the reflecting surface and a plane of the circuit board is between 150° and 165°.

7. The optical module according to claim 1, wherein a reflecting surface of each of the at least one reflector is a curved surface.

8. The optical module according to claim 7, wherein the curved surface is a concave surface.

9. The optical module according to claim 7, wherein the curved surface is a convex surface.

10. The optical module according to claim 1, wherein the at least one reflector and the housing are integrated, and the at least one reflector is separated from the circuit board.

11. The optical module according to claim 1, wherein the at least one the reflector and the housing are not integrated, and the at least one reflector is fixed on the housing.

12. The optical module according to claim 1, wherein the material of the at least one reflector is metal.

13. The optical module according to claim 1, wherein the material of both the at least one reflector and the housing is zinc alloy.

14. The optical module according to claim 1, wherein wave-absorbing material is attached onto a surface of each of the at least one reflector and/or an internal surface of the housing.

15. The optical module according to claim 14, wherein the wave-absorbing material is ferrite wave-absorbing material or polyurethane wave-absorbing material.

16. The optical module according to claim 1, wherein each of the at least one reflector is a flat reflecting plate.

17. The optical module according to claim 16, wherein one end of the flat reflecting plate is fixed on the housing, and the other end of the flat reflecting plate is insulated with the circuit board.

18. The optical module according to claim 17, wherein insulating material is provided between the flat reflecting plate and the circuit board.

19. The optical module according to claim 17, wherein the flat reflecting plate is separated from the circuit board.

* * * * *